US010261279B1

(12) United States Patent
Potter et al.

(10) Patent No.: US 10,261,279 B1
(45) Date of Patent: Apr. 16, 2019

(54) SYSTEM AND METHOD FOR DISTRIBUTING HIGH FIBER COUNT OPTICAL CABLE TO NETWORK RACKS

(71) Applicant: Sumitomo Electric Lightwave Corp., Raleigh, NC (US)

(72) Inventors: Craig Steven Potter, Cary, NC (US); Daniel Brian Hangebrauck, Garner, NC (US); Daniel Frederick Oberklein, Cary, NC (US); Patrick Stephen VanVickle, Apex, NC (US)

(73) Assignee: Sumitomo Electric Lightwave Corp., Raleigh, NC (US)

( * ) Notice: Subject to any disclaimer, the term of this patent is extended or adjusted under 35 U.S.C. 154(b) by 0 days.

(21) Appl. No.: 15/782,476

(22) Filed: Oct. 12, 2017

(51) Int. Cl.
*G02B 6/44* (2006.01)

(52) U.S. Cl.
CPC ......... *G02B 6/4446* (2013.01); *G02B 6/4452* (2013.01); *G02B 6/4472* (2013.01)

(58) Field of Classification Search
CPC ........................... G02B 6/4446; G02B 6/4471
See application file for complete search history.

(56) References Cited

U.S. PATENT DOCUMENTS

| | | |
|---|---|---|
| 4,717,231 A | 1/1988 | Dewez et al. |
| 4,765,709 A | 8/1988 | Suillerot et al. |
| 5,046,811 A | 9/1991 | Jung et al. |
| 5,071,220 A | 12/1991 | Ruello et al. |
| 5,212,761 A | 5/1993 | Petrunia |
| 5,933,563 A | 8/1999 | Schaffer et al. |
| 5,945,633 A | 8/1999 | Ott et al. |
| 6,166,331 A | 12/2000 | Sjölinder et al. |
| 6,322,178 B1 | 11/2001 | Dominique |
| 6,379,166 B1 | 4/2002 | Hagarty et al. |
| 6,538,904 B1 | 3/2003 | Isely et al. |
| 7,266,281 B1 | 9/2007 | Flatau |
| 7,583,885 B2 | 9/2009 | Kowalezyk et al. |
| 8,208,779 B2 | 6/2012 | Bonicel |
| 8,472,775 B2 | 6/2013 | Corbille et al. |
| 8,628,157 B2 | 1/2014 | Burek et al. |
| 8,660,398 B2 | 2/2014 | Abbiati |

(Continued)

FOREIGN PATENT DOCUMENTS

| | | |
|---|---|---|
| JP | 2002372634 A | 12/2002 |
| KR | 20060111757 A | 10/2006 |

(Continued)

OTHER PUBLICATIONS

"Ultima LC IP56 Fibre Breakout Boxes: 16 Way IP56 Box SingleMode Lc 4x Quad Breakout Box Grey," Comtec, https://www.comtecdirect.co.uk/product/ultima-lc-ip56-fibre-breakout-boxes/PG3027/788014, pp. 1-4, retrieved May 8, 2017.

(Continued)

*Primary Examiner* — Omar R Rojas
(74) *Attorney, Agent, or Firm* — Jenkins, Wilson, Taylor & Hunt, P.A.

(57) ABSTRACT

A rack-level breakout box, system, and method for distributing high-fiber count optical fiber cables to one or more network racks. External routing of incoming and outgoing cables around the rack is kept neat and orderly, with one large cable serving a fully populated rack and, optionally, multiple racks. A flexible mounting configuration is further provided.

21 Claims, 7 Drawing Sheets

(56) References Cited

U.S. PATENT DOCUMENTS

| | | | |
|---|---|---|---|
| 8,687,933 B2* | 4/2014 | Srutkowski | G02B 6/4452 |
| | | | 385/134 |
| 8,848,347 B2 | 9/2014 | Doorn et al. | |
| 9,008,483 B2 | 4/2015 | Larsson et al. | |
| 9,069,151 B2 | 6/2015 | Conner | |
| 9,279,951 B2 | 3/2016 | McGranahan et al. | |
| 9,389,384 B2 | 7/2016 | Solheid et al. | |
| 9,448,365 B2* | 9/2016 | Fletcher | G02B 6/4471 |
| 9,490,929 B2 | 11/2016 | Badinelli | |
| 9,500,830 B2 | 11/2016 | Lu et al. | |
| 9,559,499 B2 | 1/2017 | Alvarez | |
| 10,048,452 B1 | 8/2018 | Hangebrauck et al. | |
| 2003/0147604 A1* | 8/2003 | Tapia | G02B 6/4477 |
| | | | 385/101 |
| 2010/0195969 A1 | 8/2010 | Kennedy et al. | |
| 2011/0129185 A1 | 6/2011 | Lewallen et al. | |
| 2011/0164854 A1 | 7/2011 | Desard et al. | |
| 2013/0183012 A1 | 7/2013 | Cabanne Lopez et al. | |
| 2015/0378122 A1 | 12/2015 | Simmons | |
| 2019/0004260 A1 | 1/2019 | Hangebrauck et al. | |

FOREIGN PATENT DOCUMENTS

| | | |
|---|---|---|
| WO | WO 2017/046185 A2 | 3/2017 |
| WO | WO 2019/005758 A1 | 1/2019 |

OTHER PUBLICATIONS

Non-Final Office Action for U.S. Appl. No. 15/635,656 dated Dec. 18, 2017.

Non-Final Office Action for U.S. Appl. No. 15/826,188 dated Dec. 22, 2017.

Notice of Allowance for U.S. Appl. No. 15/826,188 dated Mar. 25, 2018.

Non-Final Office Action for U.S. Appl. No. 15/635,656 dated Oct. 26, 2018.

International Search Report and Written Opinion for PCT/US18/39447 dated Jul. 19, 2018.

Final Office Action for U.S. Appl. No. 15/635,656 dated Aug. 16, 2018.

* cited by examiner

SYSTEM AND METHOD FOR
DISTRIBUTING HIGH FIBER COUNT
OPTICAL CABLE TO NETWORK RACKS

TECHNICAL FIELD

The present subject matter relates generally to optical fiber communication networks, devices, and/or methods and, more particularly, to data centers, devices, and/or related methods.

BACKGROUND

Optical fibers are used in various types of communication networks. In a typical optical fiber communication network, a large bundle of optical fibers is routed to any of a plurality of network racks. These fibers can be provided as single, large cable extending over a long distance. These cables are eventually separated into groupings that are distributed to network racks and further routed to equipment or modules mounted in these network racks.

The large cables can be heavy and difficult to physically manage, while at the same time requiring careful handling to prevent breakage. Therefore, in conventional networks these large cables are often separated into multiple cables upstream from the network rack. However, this creates additional connection points, which reduces signal quality, as well as increasing space requirements for the cables. As such, a need presently exists for improved devices and methods to facilitate the routing of high-fiber count optical cables directly to a network rack without the need for upstream separation thereof.

SUMMARY

Optical fiber network devices, systems, and related methods are provided herein. These devices and systems can provide an improved method for joining and distributing an optical fiber cable to multiple network rack or enclosure modules within a single communications rack or enclosure or multiple communications racks or enclosures.

Devices and systems disclosed herein allow for the routing of high-fiber count optical fiber cables to network racks while minimizing clutter and providing protection for the fibers. Breakout boxes can advantageously be mounted to one or more network racks and can, in some aspects, mount to an upper region of the racks and be used for distribution of fibers to the rack or racks.

With a system as disclosed herein, the routing of incoming and outgoing cables around the rack is kept neat and orderly, with one or more cables serving a plurality of racks. The breakout of the cable and distribution of the fibers to the racks occurs inside the breakout boxes, which provide protection for the fibers while still allowing easy access for fiber handling by a removable cover.

In some aspects, optical fiber cables can be routed to a network rack by a rack-level breakout box. The breakout box distributes a plurality of fiber bundles, each of which have a plurality of optical fibers that are separated from an optical fiber cable, to modules within a rack. The breakout box has a base section with at least first and second side walls attached to a rear wall; a plurality of first openings formed in the first side wall; and a plurality of second openings formed in the second side wall. The breakout box further comprises a cover that is removably attached to the base section and mounting arms that are each configured to attach the base section to the rack.

In other aspects, optical fiber cables can be distributed in a system having a plurality of breakout boxes. The optical fiber cable can be received by a first opening in a first breakout box, where it can be separated into a plurality of fiber bundles for distribution to a first rack and a secondary optical fiber cable for distribution to a second breakout box. The secondary optical fiber cable can extend from inside the first breakout box through another first opening of the first breakout box and be received by a first opening of a second breakout box. The secondary optical fiber cable can then be separated into one or more secondary fiber bundles for distribution to a second network rack.

BRIEF DESCRIPTION OF THE DRAWINGS

A full and enabling disclosure of the present subject matter is set forth more particularly in the remainder of the specification, including reference to the accompanying figures (also, "figs.") that are given merely by way of explanatory and non-limiting example, relating to one or more example embodiments, in which.

DETAILED DESCRIPTION

The present subject matter provides optical fiber breakout devices, systems, and methods capable of improving ease of installation of optical fibers in optical fiber communication networks, specifically in optical fiber cables supplying network racks or enclosures. In this way, the devices, systems, and methods disclosed herein can be used to reduce installation time and cost, as well as to aid in preventing damage to the optical fibers while they are segregated from the larger optical fiber bundle and connected to respective and/or corresponding rack modules within the network rack associated with the optical fiber bundle.

Specifically, for example, in one aspect, the present subject matter provides a solution to allow for separation and "breakout" of fibers from a large optical fiber bundle for distribution to network racks and rack shelves. The extensible nature of the breakout box allows a small number of ultra-high fiber count cables to service a network rack or racks and provides flexibility to adapt to multiple configurations of rack shelves and fiber count needs.

Figure 1:
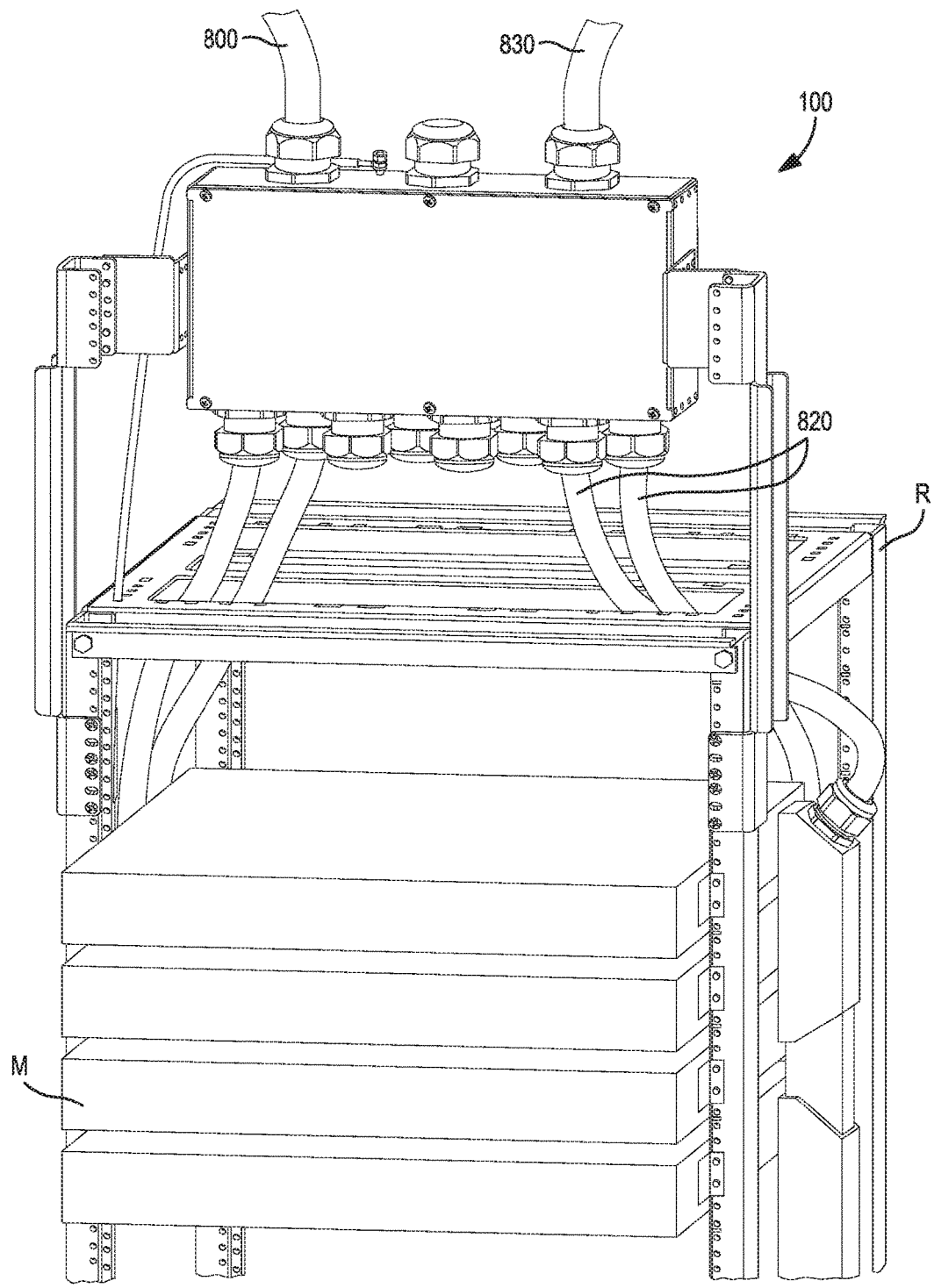
FIG. 1 is a perspective view of an embodiment of an optical fiber breakout box assembled in a network rack.

In one aspect, FIG. 1 shows an example embodiment of a breakout box, generally designated 100, for optical cables, mounted to network enclosure which is referred to herein, without limitation, as network rack R. In a typical network application, an optical fiber cable 800 is supplied to a network rack R from an area above the rack aisle, and optical fiber cable 800 is sized (e.g., has a specified or desired number of optical fibers for a given application) according to the maximum number of network modules M that can be installed in rack R. While optical fiber cable 800 is shown being supplied from above the rack aisle, in other embodiments, optical fiber cable can be installed in and/or supplied from any suitable direction, including from below, in front of, behind, or from the lateral sides of network rack R and/or rack aisle. For example, in the embodiment shown in FIG. 1, optical fiber cable 800 can have 6,912 fibers. These 6,912 fibers can be distributed within the rack according the configuration of the installed modules. For example, a 6,912 fiber cable can provide 288 fibers to each of 24 network modules M. Other fiber counts or bundle sizes can also be employed for connecting to the network modules M, including smaller bundles for serving a single network module M. Because every connection or fiber splice introduces potential losses in terms of signal strength and sources of noise, it is desirable to use continuous, uninterrupted fibers whenever possible. An installer must therefore use considerable care in handling optical fiber cable 800 as it is fed to network rack R. A rack-mounted breakout box, generally designated 100, according to this example embodiment is configured to protect the individual fibers within optical fiber cable 800, as these individual fibers are separated from optical fiber cable 800, gathered into bundles which can be referred to as fiber bundles 810. The separated bundles can be enclosed in a hollow flexible conduit 820 and routed to respective and/or corresponding network modules M. While it is advantageous for breakout box 100 to be rack-mounted to avoid introducing stresses to optical fiber cable 800 by relative movements between breakout box 100 and network rack R, breakout box 100 can, in some embodiments, be affixed to another structure other than network rack R.

Breakout box 100 is mounted (e.g., indirectly or directly) to network rack R. Breakout box 100 accepts optical fiber cable 800 on a first (e.g., upper) side, as shown in FIG. 1, through a first opening. Inside breakout box 100, individual fibers are separated into groups, or optical fiber bundles, 810 (see, e.g., FIG. 4). Optical fiber bundles 810 are fed through second (e.g., exit) openings in a rack-facing (e.g., lower) side of breakout box 100 via hollow conduit 820. One breakout box 100 can service, for example, one network rack R. However, it should also be understood that breakout box 100 can be configured to provide optical fibers to other numbers (e.g., two, three, or more) of network racks R. Any excess fibers not assigned to be connected to network rack R can be fed through an additional port or ports on the first side of breakout box 100 and be provided to other network racks installed adjacent or near to network rack R via a secondary hollow conduit 830. In some embodiments, it is advantageous for breakout box 100 to be mounted above or offside from network rack R. Breakout box 100 is configured to mount entirely over network rack R or, optionally, inside an upper region thereof, to accommodate varying levels of overhead space available at an installation site of network rack R.

Figure 2:
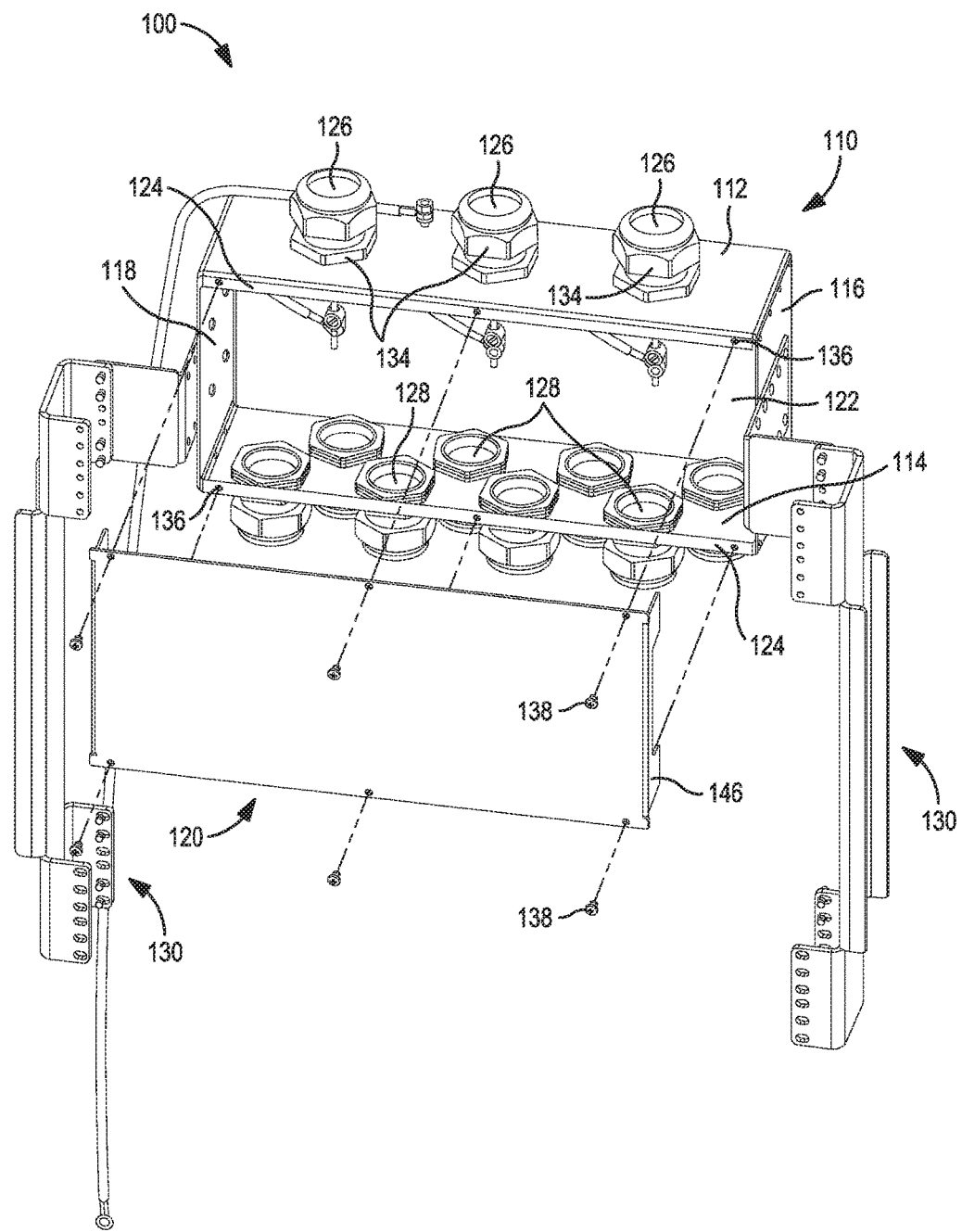
FIG. 2 is an exploded view of the embodiment of the optical fiber breakout box of FIG. 1.
Figure 3:
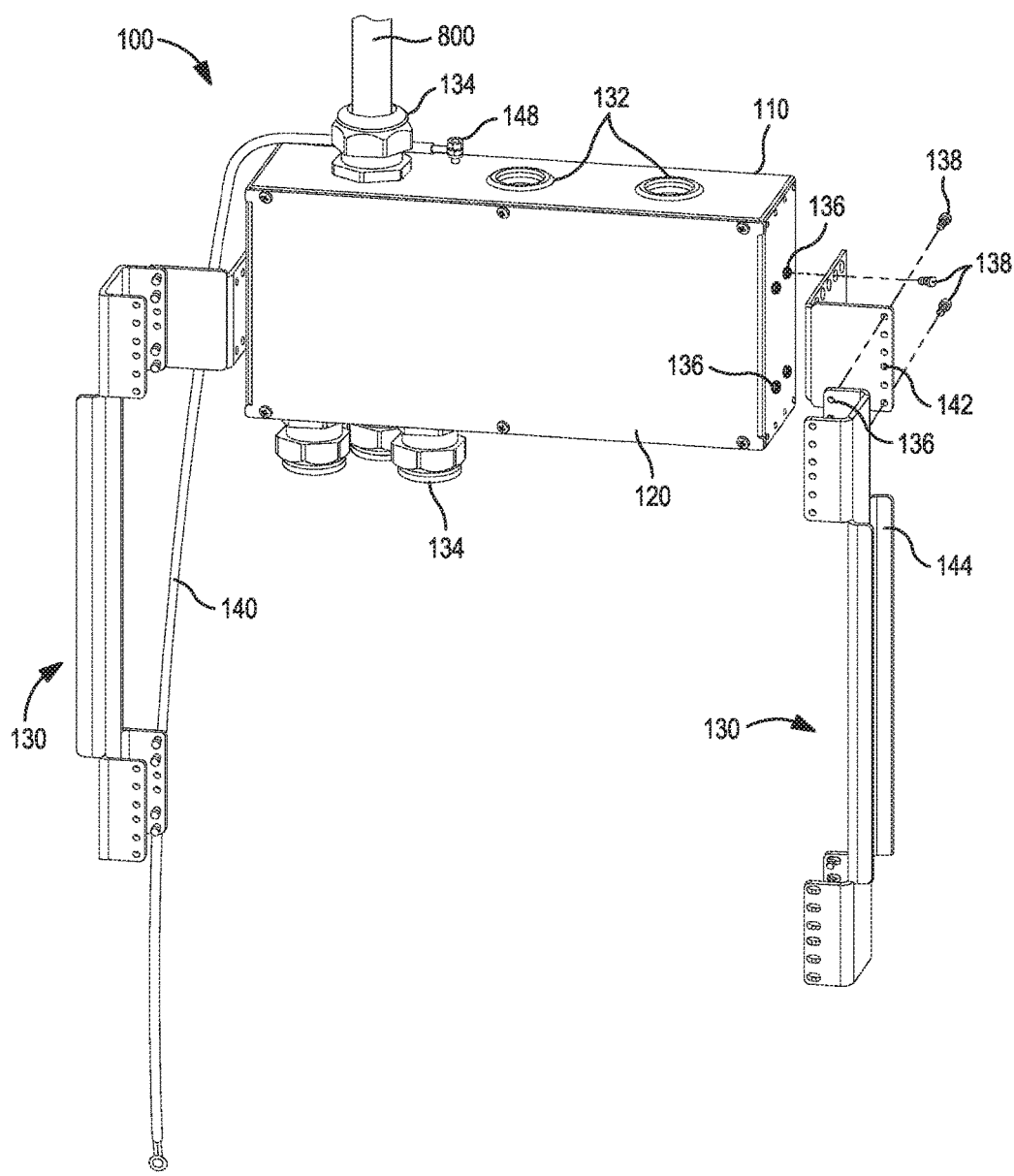
FIG. 3 is a perspective view of the embodiment of the breakout box of FIG. 1.

Referring to FIGS. 2 and 3, greater detail of breakout box 100 is shown in the exploded view of FIG. 2 and the perspective assembled view of FIG. 3. There are three main portions of breakout box 100: a base section, generally designated 110, a cover, generally designated 120, which is configured for removable attachment to base section 110, and mounting arms, generally designated 130. Base section 110 has four lateral side walls: two opposing first and second side walls 112 and 114, and two side walls 116 and 118 that are at least substantially orthogonal (e.g., within 10°, 5°, 2, or 1°) relative to side walls 112 and 114. As shown in FIG. 2, side walls 112, 114, 116 and 118 are attached on one side to a rear wall 122 and removably attachable on the opposite sides thereof to cover 120. Side walls 116 and 118 are further configured to be attached by a planar surface to mounting arms 130.

Side walls 112, 114, 116 and 118 and rear wall 122 can be at least substantially flat, although those skilled in the art will recognize that it will be advantageous in some embodiments to have features (e.g., embossed areas, notches, cutouts, pockets, and the like) formed in on or more of side walls 112, 114, 116 and 118 and rear wall 122. In some embodiments, side walls 112, 114, 116 and 118 and rear wall 122 can be formed integrally from a single piece (e.g., bent from a single piece of sheet metal). Side walls 112, 114, 116, and 118 as shown each have an at least substantially rectangular shape that together form a rectangular cross section. For example, vertically-oriented side walls 116, 118 can have a shorter length than horizontally-oriented side walls 112, 114. Other configurations and shapes are envisioned as well. One or more of the side walls 112, 114, 116, and/or 118 can have one or more tabs 124 for added structural rigidity and to provide a mounting surface for cover 120.

Figure 7:
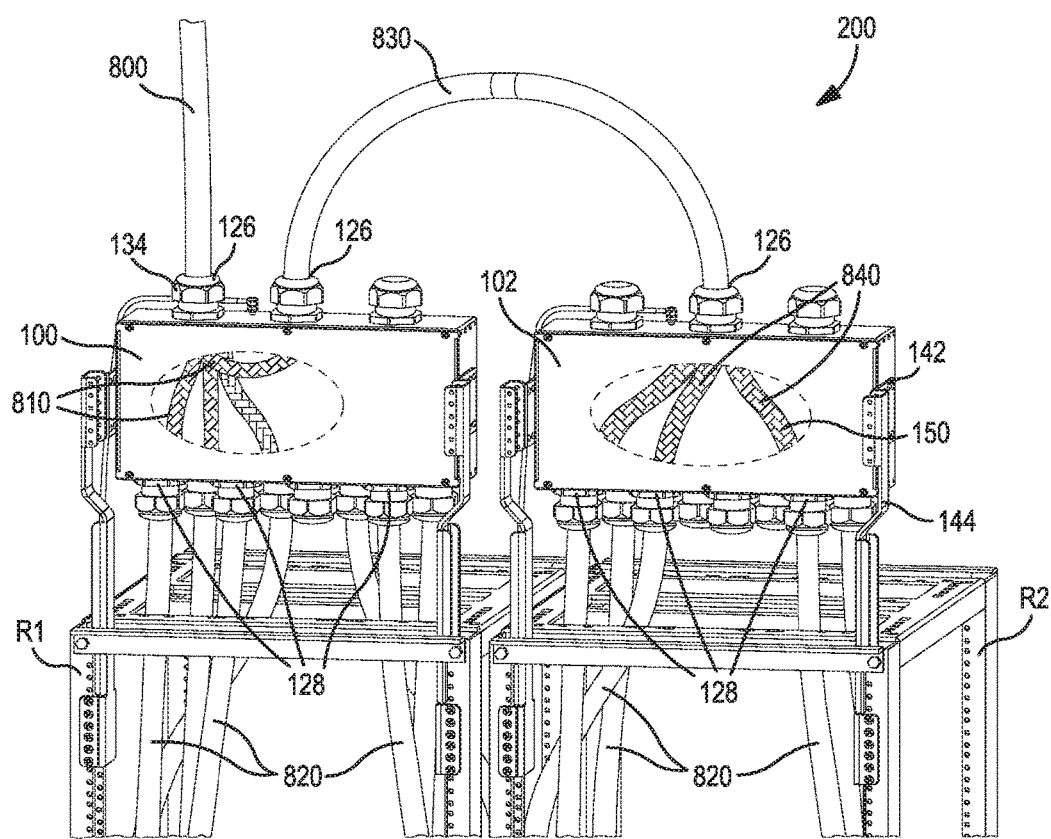
FIG. 7 is a perspective view of an embodiment of an optical fiber breakout box system assembled in a network rack.
Figure 8:
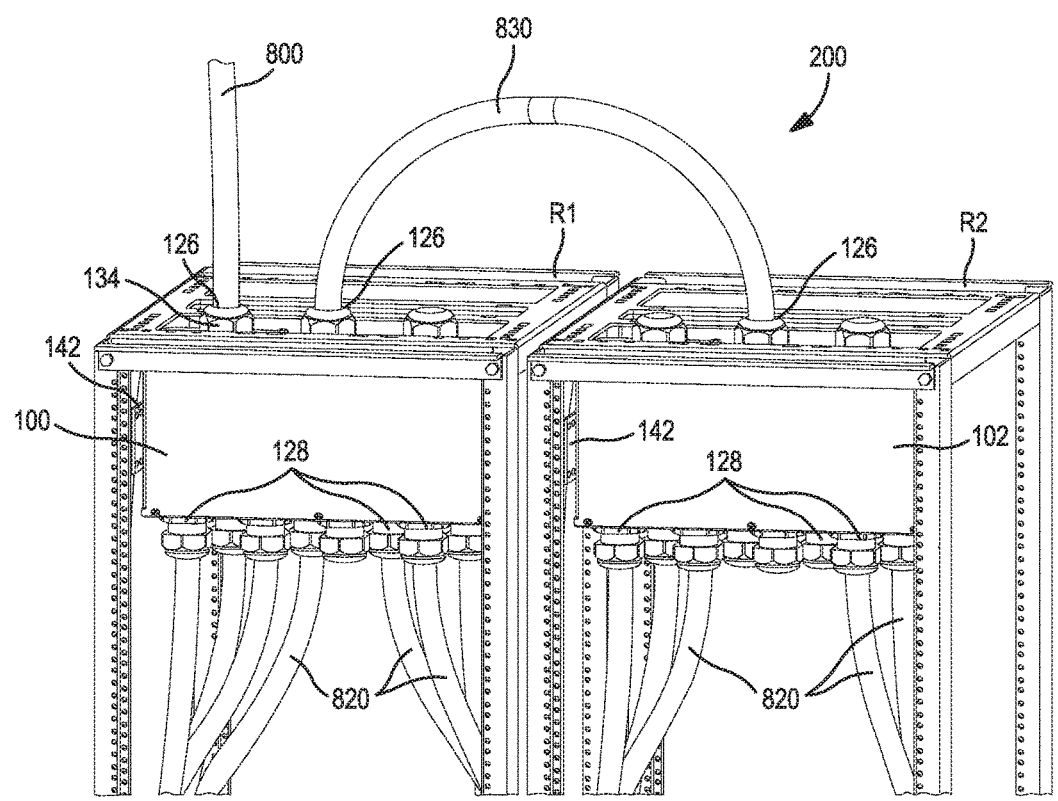
FIG. 8 a perspective view of another embodiment of an optical fiber breakout box system assembled in a network rack.

Side wall 112 can have one or more first openings 126 formed therein for the passage of optical fiber cable 800 and, optionally, a subset of fibers to be routed to another rack (e.g., an optical fiber bundle 810 and hollow conduit 820; see, FIGS. 7 and 8). Side wall 112 can have a plurality (e.g., two, three, or more) of first openings 126 formed therein. First openings 126 are configured to receive an incoming cable (e.g., optical fiber cable 800, see FIG. 1), and, optionally, to dispense a portion of the fibers after being separated therefrom. In a typical installation, one or two first openings 126 are configured to accommodate incoming cables, and a third first opening 126 can be used to route an optical fiber bundle 810 via hollow conduit 820 to a second network rack located adjacent to (e.g., a short distance from) the first rack. In this manner, one or two ultra-high fiber count cables can serve multiple racks, with a "master" breakout box (e.g., breakout box 100) feeding fibers to additional network racks via additional breakout boxes (e.g., breakout box 102, FIG. 7) mounted on those racks.

Breakout box 100 also has second openings 128 formed in and/or through a thickness of second side wall 114. The number of second openings can be selected depending on the number of network modules (see, e.g., M, FIG. 1) to be serviced. Second openings 128 are configured as an exit for optical fibers which have been separated into bundles (see, e.g., 810, FIG. 1) from the optical fiber cable (see, e.g., 800, FIG. 1) received in a first opening 126. Optical fiber bundles 810 are routed through hollow conduit 820 to network modules M mounted in network rack (see, e.g., R, FIG. 1). As shown in FIG. 2, first openings 126 and second openings 128 are shown as having a circular cross-sectional shape, but any suitable cross-sectional shape can be selected.

In some embodiments, such as the embodiment shown in FIG. 3, a protective insert 132 is provided in one or more of first openings 126 and/or second openings 128 in order to protect optical fibers passing therethrough from damage, which may occur during installation and/or during operation. Protective insert 132 can be made of any suitable non-abrasive material (e.g., rubber, silicone, plastic, and the like). Protective insert 132 may be omitted in some embodiments, such as, for example, where the optical fibers have their own protective sheathing. In some embodiments, protective insert 132 is configured as a plug to block the passage of objects through first opening 126 or second opening 128

Figure 6:
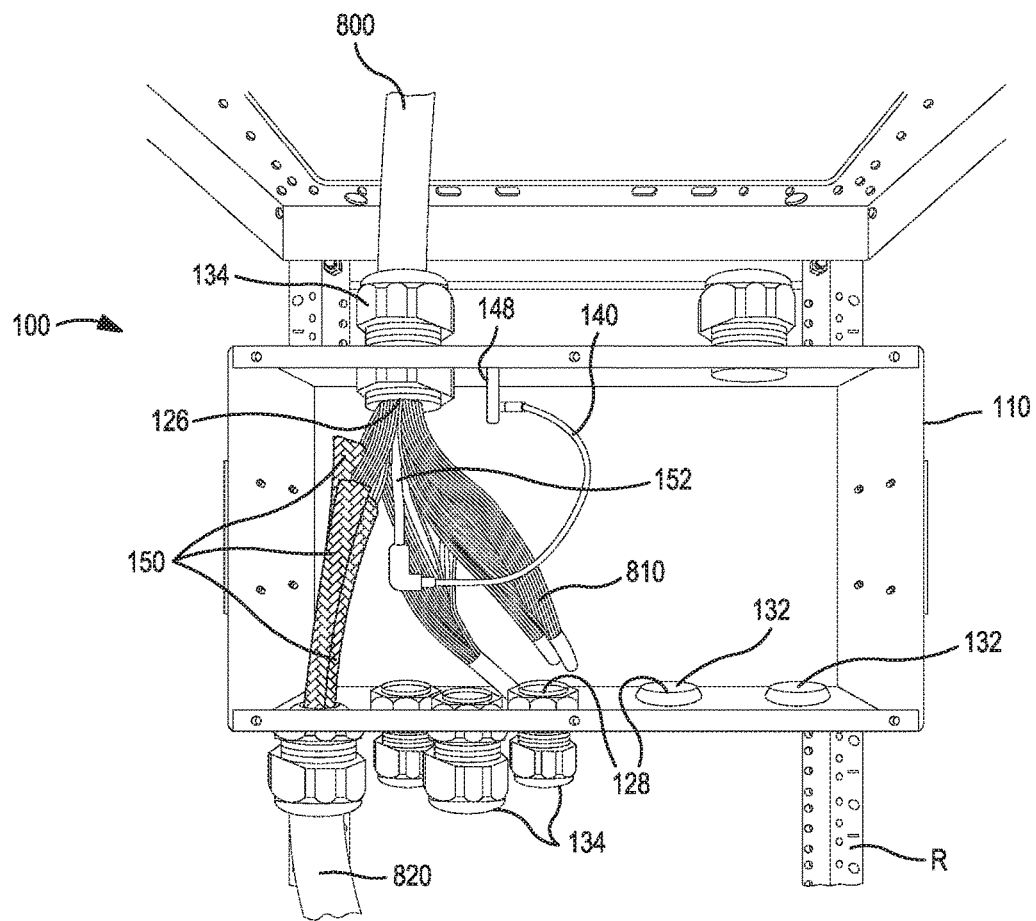
FIG. 6 is an assembly view of another example embodiment of an optical fiber breakout box.

(see also, FIG. 6). For example, in some embodiments where a network rack may not be fully populated (e.g., has less than a maximum number of network modules installed therein) with network modules, some first openings 126 or second opening 128 may include a cover (e.g., a rubber grommet or any suitable plug) that fills the desired first and/or second openings 126 and/or 128.

A device known as a cable gland, which can also be described as a threaded ferrule 134, can also be disposed on, secured to, and/or formed integral to side walls 112, 114 such that a first opening 126 and/or second openings 128 pass through threaded ferrule 134, aligned along the longitudinal axis of threaded ferrule 134. Threaded ferrule 134 is configured as a strain-relief device, to which hollow conduits 820 and secondary hollow conduits 830 can be connected. Threaded ferrules 134 and hollow conduits 820, 830 protect an optical fiber cable or fiber bundle (see, e.g., 800, 810, 840, FIG. 6) from excess bending (e.g., bending in excess of a specified minimum bend radius for a given optical fiber cable or fiber group), and lock the fiber bundle(s) in place relative to breakout box 100. This locking in place can be accomplished, for example, by threadably installing (e.g., screwing on) of a first part of threaded ferrule 134 over a second part of threaded ferrule 134, wherein the second part of threaded ferrule 134 is configured to remain secured to side wall 112 or 114 while the first part of threaded ferrule 134 is threadably engaged with and/or disengaged from the second part of threaded ferrule 134.

Cover 120 is formed to fit the shape and/or cross sectional profile (e.g., rectangular) of base section 110. Side walls 112, 114, 116, and/or 118 can have at least one mounting tab 124 attached thereto, with a fastener such as threaded screws, rivets, bolts, hinged latch, etc. For example, as depicted in FIG. 2, internally threaded mounting holes 136 are formed in base section 110 so that base section 110 can be securely attached to cover 120 by screws 138 passing through corresponding holes formed in cover 120. It is to be understood that, while the fastener for cover 120 is shown as internally threaded holes 136 and screws 138, any suitable fastening arrangement can be used. Cover 120 is at least substantially flat and has stiffening walls 146 to provide additional stiffness and to assist in positioning cover 120 in base section 110.

Referring to FIG. 3, in some embodiments, breakout box 100 can include one or more ground wire 140. Ground wire 140 is connected to base section 110 and to a ground lug 148 on base section 110 and on a network rack post (not shown), providing grounding for breakout box 100 and any electrically conductive hardware attached thereto.

Breakout box 100 can be attached to network rack (see, e.g., R, FIG. 1) via mounting arms 130. Mounting arms 130 can, in some embodiments, be configured to provide multiple options for attachment methods. Each mounting arm 130 can be formed in one or a plurality of sections, which can be used individually or in combination. For example, mounting arm 130 can include an at least substantially L-shaped section and an at least substantially longitudinal section (i.e., having a length greater than a width) that can be configured to mount the breakout box at a particular position. The longitudinal section can be, for example, flat or channel-shaped with strengthening tabs, and it can have a length-to-width ratio of 2:1 or more. The longitudinal section be designed for a length and width to mount breakout box 100 at a particular vertical and/or horizontal location. In the embodiment of FIG. 3, mounting arms 130 are formed from angle bracket 142 and longitudinal section 144 that are removably attachable to each another. Angle bracket 142 can be configured to attach to either longitudinal section 144 or to network rack itself. For example, angle bracket 142 can attach to one of the side walls (see, e.g., 116 and 118, FIG. 2) of base section 110 on a first end of angle bracket 142. On the opposite (e.g., second) end, angle bracket 142 can connect to either a longitudinal section 144 of mounting arm 130, or angle bracket 142 can be connected directly to a network rack. Angle bracket 142 is fastened to base section 110 by a first planar surface on its first end and to longitudinal section 144 by a second planar surface on its second end. Base section 110 and angle bracket 142 can be joined, for example, by providing internally threaded mounting holes 136 in side walls 116, 118 and corresponding holes formed in angle bracket 142, and joining the parts with screws 138. In another example embodiment, through-holes can be provided both in side walls 116, 118 and in angle bracket 142, and the parts can be bolted together with appropriate mounting hardware (e.g., with threaded nuts and bolts). The parts can also be joined by any other suitable fastening arrangement. Similarly, angle bracket 142 can be joined to longitudinal section 144 by any suitable type of attachment, such as internally threaded holes 136 formed in longitudinal section 144, corresponding holes formed in angle bracket 142, and screws 138. Longitudinal section 144 is in turn attached on the opposite end to vertical support rails of network rack R using a suitable fastening means such as screws or bolts. In some embodiments, captive threaded nuts can be provided in place of the internal threads of holes 136 for threadable engagement with screws 138.

Figure 4:
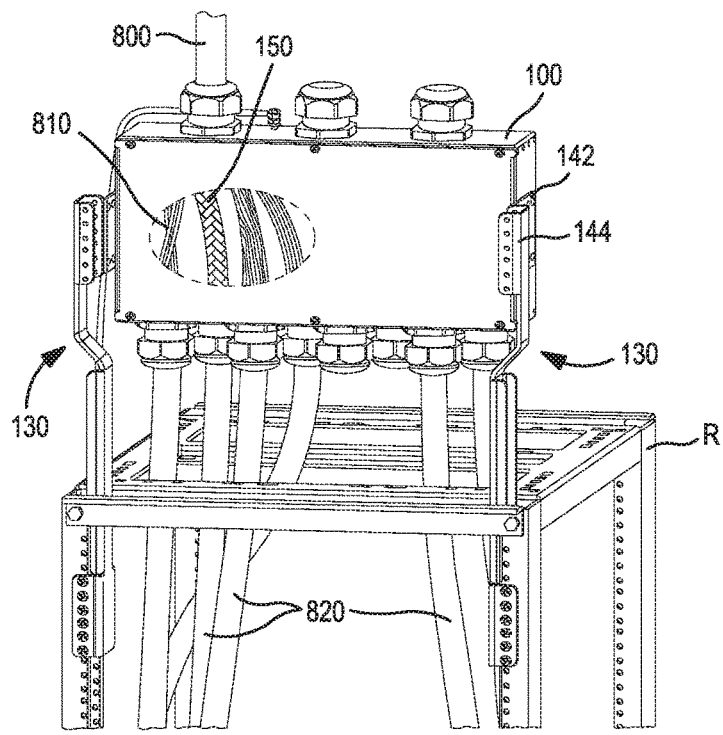
FIG. 4 is a perspective view of an embodiment of an optical fiber breakout box assembled in a network rack.
Figure 5:
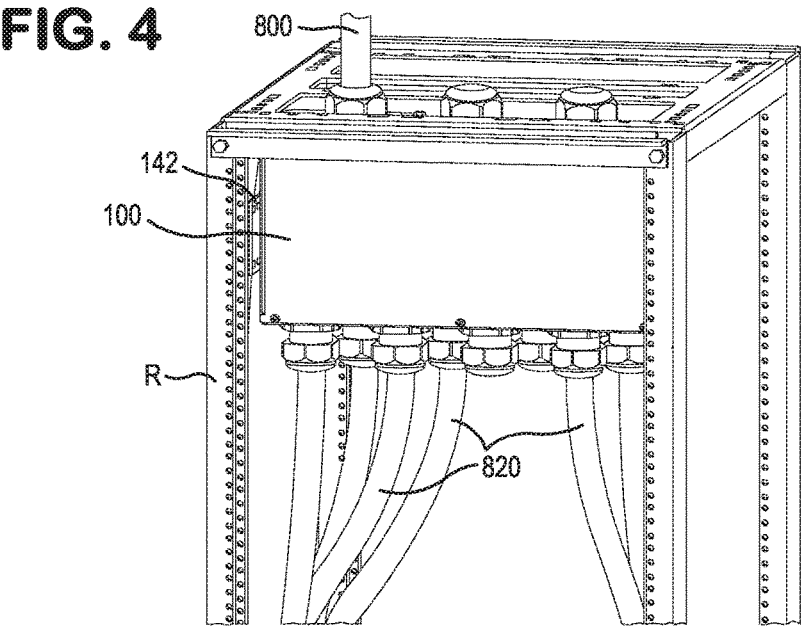
FIG. 5 is a perspective view of another embodiment of an optical fiber breakout box assembled in a network rack.

Referring now to FIGS. 4 and 5, example mounting configurations are shown. For example, in the embodiment of FIG. 4, breakout box 100 is mounted over the top of a network rack R by two mounting arms, generally designated 130, which are attached at opposite lateral sides of breakout box 100. In this embodiment, mounting arms 130 each include both angle bracket 142 and longitudinal section 144. In another example embodiment, FIG. 5 depicts another possible mounting configuration of breakout box 100 to network rack R. Breakout box 100 is attached to an interior region of network rack R using only angle brackets 142. In the example configuration of FIG. 5, angle brackets 142 are bolted directly to vertical support rails of network rack R. An interior region mounting location may be desired in installations where there is insufficient vertical space above the network rack for breakout box 100 and incoming cables to be arranged therein. In other embodiments, network rack R may be populated with equipment near the top, leaving insufficient space at the top of network rack R to accommodate hollow conduits 820 containing optical fiber bundles 810 exiting the breakout box. In this scenario, breakout box 100 can be mounted in an upper rear portion of network rack R (e.g., behind a rear surface of network modules M installed therein) to route hollow conduits 820 containing optical fiber bundles 810 alongside or behind network modules.

FIG. 6 depicts an internal view of a breakout box, generally designated 100, illustrating a method of routing optical fibers from an optical fiber cable 800 to a network rack R. As shown in FIG. 6, breakout box 100 receives an optical fiber cable 800 through a first opening 126 and ferrule 134. Inside breakout box 100, optical fiber cable 800 is separated into a plurality of optical fiber bundles 810. An electrical ground wire 140 can optionally be connected to a metallic (e.g., steel) center member 152 of optical fiber cable 800, if present, and to a ground lug 148 attached to base section 110. Additionally, one or more protective sleeves 150 can be applied over the fiber optical fiber bundles 810.

Protective sleeve 150 protects the fibers from damage during handling or contact with the hardware (e.g., breakout box 100, etc.) and aids in stringing optical fiber bundles 810 through hollow conduits 820, 830. Optical fiber bundles 810 exiting breakout box 100 (e.g., to be routed to the rack modules via hollow conduits 820, 830) may be covered by any of several forms of protective sleeve 150, such as plastic or metal conduit or nylon "socks" to protect the fibers from damage. Protective sleeves 150 can also be color-coded to assist in fiber identification. Any excess fibers that are not to be routed to network modules M can be coiled and stored within breakout boxes 100. In this embodiment, optical fiber bundles 810 exit breakout box 100 through a second opening 128. Second openings 128 that are not to be utilized in a particular application are filled with a protective insert 132, shown in this embodiment in the form of a plug, such as a compliant rubber grommet.

FIGS. 7 and 8 depict a breakout box system, generally designated 200, whereby a plurality of breakout boxes, such as first and second breakout boxes 100 and 102, provide optical fibers to multiple network racks, such as first and second network racks R1 and R2. In the embodiment of FIG. 7, a first breakout box 100 receives an optical fiber cable 800 through a first opening 126 and ferrule 134. Inside breakout box 100, optical fiber cable 800 is separated into a plurality of fiber optical fiber bundles 810, which are routed to network modules M (not shown) by way of hollow conduit 820 and to a second breakout box 102 by way of secondary hollow conduit 830. Optical fiber bundles 810 are passed through hollow conduit 820 connected to second openings 128, depending on the particularities of a given installation and/or application, to service network modules M (see, e.g., FIG. 1) located on first network rack R1. Secondary hollow conduit 830 connects to first breakout box 100 in another first opening 126 of breakout box 100 and is routed to a first opening 126 of second breakout box 102. Inside breakout box 102, an optical fiber bundle 810 is again separated, depending on the particularities of a given installation and/or application, into further fiber bundles 840 and distributed to network modules within second network rack R2. Fiber bundles 810, 840 associated with second breakout box 102 can also optionally be protected by a conduit, jacket, or other protective sheath (e.g., 150) as described for breakout box 100. Any additional unused fibers can be coiled and stored within first and/or second breakout boxes 100 and/or 102. As shown in FIG. 7, first and second breakout boxes 100 and 102 can be mounted above first and second network racks R1 and R2 using a configuration of mounting arm 130, having angle bracket 142 and longitudinal section 144. FIG. 8 also depicts breakout box system 200 with an at least substantially similar configuration to FIG. 7, but having an alternate mounting arrangement, as was described in greater detail with respect to the embodiment shown in FIG. 5. As shown in FIG. 8, first and second breakout boxes 100 and 102 are attached within an interior region of first and second network racks R1 and R2, respectively, using only angle bracket 142 portion of mounting arm 130 for their installation therein. While the subject matter has been described herein with reference to specific aspects, features, and illustrative embodiments, it will be appreciated that the utility of the subject matter is not thus limited, but rather extends to and encompasses numerous other variations, modifications and alternative embodiments, as will suggest themselves to those of ordinary skill in the field of the present subject matter, based on the disclosure herein.

Various combinations and sub-combinations of the structures and features described herein are contemplated and will be apparent to a skilled person having knowledge of this disclosure. Any of the various features and elements as disclosed herein can be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claimed elements.

What is claimed is:

1. A breakout box for distributing one or more optical fiber cables to modules within a rack, the breakout box comprising:
   a base section comprising:
      at least first and second side walls attached to a rear wall;
      at least one first opening in the first side wall; and
      a plurality of second openings in the second side wall;
   a cover that is removably attached to the base section;
   one or more mounting arms attaching the base section to the rack; and
   threaded ferrules disposed on and/or at least partially within one or more of the plurality of first and/or second openings,
   wherein each optical fiber cables has a plurality of fibers and is accepted into one of the first openings, and
   wherein the plurality of fibers are separated into a plurality of fiber bundles within the breakout box, and at least some of the plurality of fiber bundles pass out of one or more of the first and/or second openings.

2. The breakout box of claim 1, wherein the first side wall is arranged on an opposite side of the rear wall relative to the second side wall.

3. The breakout box of claim 1, wherein the threaded ferrules are configured to receive the optical fiber cable or one of the plurality of fiber bundles therethrough.

4. The breakout box of claim 2, further comprising one or more protective sleeves for covering one or more of the plurality of fiber bundles.

5. The breakout box of claim 1, wherein the plurality of first openings comprises three openings, and wherein the plurality of second openings comprises eight openings.

6. The breakout box of claim 1, wherein the breakout box is disposed entirely within the rack in an upper region of the rack, above the modules within the rack.

7. The breakout box of claim 1, further comprising a ground wire that is configured to be connected to the base section and to a ground lug on the network rack.

8. The breakout box of claim 1, further comprising a plug or protective insert that is disposed on and/or in, at least partially, one or more of the first and/or second openings.

9. The breakout box of claim 1, wherein at least one of the plurality of first openings receives an optical fiber cable with 6,912 optical fibers therein.

10. The breakout box of claim 1, wherein the optical fiber cable is separated into the plurality of fiber bundles inside the breakout box, and wherein each of the plurality of fiber bundles comprises 864 optical fibers.

11. The breakout box of claim 1, wherein each mounting arm comprises:
    an L-shaped angle bracket; and
    an at least substantially longitudinal section,
    wherein the longitudinal section is detachable from the angle bracket.

12. The breakout box of claim 1, wherein each mounting arm comprises an L-shaped angle bracket that is configured to attach the base section directly to the network rack.

13. A breakout box system for distributing a plurality of fiber bundles, each of which have a plurality of optical fibers that are separated from an optical fiber cable, to modules within a plurality of racks, the system comprising:
at least a first and second breakout box, each breakout box comprising:
a base section comprising:
at least first and second side walls attached to a rear wall;
a plurality of first openings formed in the first side wall; and
a plurality of second openings formed in the second side wall,
a cover that is removably attached to the base section; and
one or more mounting arms that are each configured to attach the base section to a respective one of the plurality of racks; and
an optical fiber cable,
wherein the optical fiber cable is received by one of the plurality of first openings of the first breakout box and separated into a plurality of fiber bundles and a secondary optical fiber cable comprising at least a portion of the optical fiber cable,
wherein the secondary optical fiber cable extends from inside the first breakout box through another of the plurality of first openings of the first breakout box and is received by one of the plurality of first openings of the second breakout box,
wherein the secondary optical fiber cable is separated into one or more secondary fiber bundles, and
wherein at least one of the plurality of fiber bundles extends through one or more of the plurality of second openings in the first breakout box and at least one of the one or more secondary fiber bundles extends through one or more of the plurality of second openings in the second breakout box.

14. The breakout box system of claim 13, wherein the first and the second breakout boxes are mounted on first and second racks of the plurality of racks.

15. The breakout box of claim 13, wherein the plurality of first openings consists of three openings and the plurality of second openings consists of eight openings.

16. The breakout box system of claim 13, wherein the optical fiber cable comprises 6,912 optical fibers and the secondary optical fiber cable comprises a portion less than all of the 6,912 optical fibers of the optical fiber cable.

17. The breakout box system of claim 13, wherein each breakout box is disposed in an upper region of a network rack.

18. The breakout box system of claim 13, further comprising one or more protective sleeves for covering one or more of the plurality of fiber bundles and/or at least one of the one or more secondary fiber bundles.

19. A method of routing optical fibers to modules within one or more racks, the method comprising:
providing a first breakout box, wherein the first breakout box comprises:
a base section comprising:
at least first and second side walls attached to a rear wall;
at least one first opening formed in the first side wall; and
a plurality of second openings formed in the second side wall,
a cover that is removably attached to the base section; and
one or more mounting arms that are each configured to attach the base section to a first rack of the one or more racks;
mounting the base section to the first rack via the one or more mounting arms;
arranging threaded ferrules on or at least partially within one or more of the first openings and/or one or more of the plurality of second openings;
feeding an optical fiber cable through one of the first openings;
separating optical fibers from the optical fiber cable into one or more fiber bundles;
passing each of the one or more fiber bundles through a respective one of the plurality of second openings;
tightening at least one of the ferrules to secure, relative to the first breakout box, the optical fiber cable and/or at least one of the one or more fiber bundles; and
attaching the cover to the base section.

20. The method of claim 19, wherein the one or more racks comprises a second rack, the method comprising:
forming a secondary optical fiber cable from a portion of the optical fiber cable inside the first breakout box;
feeding the secondary optical fiber cable through another of the plurality of first openings in the first breakout box prior to attaching the cover of the first breakout box;
providing a second breakout box, wherein the second breakout box comprises:
a base section comprising:
at least first and second side walls attached to a rear wall;
at least one first opening formed in the first side wall; and
a plurality of second openings formed in the second side wall,
a cover that is removably attached to the base section; and
one or more mounting arms that are each configured to attach the base section to the second rack;
mounting the second breakout box to the second rack via the one or more mounting arms of the second breakout box;
arranging threaded ferrules on or at least partially within one or more of the first openings and/or one or more of the plurality of second openings of the second breakout box;
feeding the secondary optical fiber cable through one of the first openings of the second breakout box;
separating optical fibers from the secondary optical fiber cable into one or more secondary fiber bundles;
passing each of the one or more secondary fiber bundles through a respective one of the plurality of second openings of the second breakout box;
tightening at least one of the ferrules to secure, relative to the second breakout box, the secondary optical fiber cable and/or at least one of the one or more secondary fiber bundles; and
attaching the cover to the base section of the second breakout box.

21. The method of claim 20, comprising applying a protective sleeve to the optical fiber cable, the one or more fiber bundles, the secondary optical fiber cable, and/or the secondary optical fiber cable, respectively, prior to passing through the pluralities of first and/or second openings of the first and/or second breakout boxes, respectively.

* * * * *